United States Patent [19]

Bremer

[11] Patent Number: 4,525,847

[45] Date of Patent: Jun. 25, 1985

[54] QAM ENCODER

[75] Inventor: Gordon Bremer, Clearwater, Fla.

[73] Assignee: Paradyne Corporation, Largo, Fla.

[21] Appl. No.: 440,500

[22] Filed: Nov. 10, 1982

[51] Int. Cl.³ .............................................. H04L 27/20
[52] U.S. Cl. ...................................... 375/59; 375/39; 375/67; 328/14; 332/9 R
[58] Field of Search ...................... 375/39, 42, 59, 67; 328/14, 27; 364/724, 607, 721; 340/347 DD; 332/9 R, 11 R, 17, 10

[56] References Cited

U.S. PATENT DOCUMENTS

| 4,246,642 | 1/1981 | Magill | 375/14 |
| 4,346,448 | 8/1982 | Insam et al. | 328/14 |
| 4,368,433 | 1/1983 | Imazeki et al. | 328/14 |
| 4,435,823 | 3/1964 | Davis et al. | 375/14 |

Primary Examiner—Benedict V. Safourek
Attorney, Agent, or Firm—Kane, Dalsimer, Kane Sullivan & Kurucz

[57] ABSTRACT

This invention describes a QAM encoder which makes use of memory means to generate the desired QAM signals. Each QAM signal corresponds to a group of bits which are defined by an angle on a standard eye-pattern. Each group is passed serially through delay circuits and at the output of each delay circuit there are look-up circuits which select a number from the memory which is a product of the sine of the angle of the group as modified by a sampling signal and a coefficient. These coefficients correspond to the coefficients of the standard transversal digital filter. The numbers generated by each look-up circuit are added to generate the output signals.

10 Claims, 4 Drawing Figures

STANDARD
4800 BPS
ø-9 POINT

QAM ENCODER

BACKGROUND OF THE INVENTION

This invention relates to an encoder for modems using QAM and PSK type modulation, and more particularly to an encoder without multipliers.

Modems using QAM and PSK type modulation have become standard in the data communications field. Briefly, such modems transmit and receive multi-valued modulated symbols which are distinguishable by phase and radial amplitude. Such symbols may be represented as points on a complex eye diagram. In the past the symbols have been generated by respectively feeding the X- and Y- coordinates of the points representing the symbols into two transversal digital filters. The outputs of the filters were used to modulate, respectively, a sine and cosine wave of the desired frequency. The two waves were then combined to produce the desired symbol. Such systems may be inaccurate because the transversal digital filters contain a plurality of multipliers which can degrade the transmitted symbols. Furthermore, the system is difficult and costly to implement with digital circuits.

OBJECTIVES AND SUMMARY OF THE INVENTION

An object of this invention is to provide an encoder which does not use multipliers, thus eliminating a possible source of signal degradation.

Another object is to provide an encoder which can be readily implemented from digital circuits and/or microprocessors at a minimum cost. Other objects and advantages of the invention shall be described in relation to the description of the preferred embodiment.

In the standard encoder referred to above each X- and Y- coordinate value is multiplied and summed a given number of times yielding a discrete number of values N. In the present invention, intermediate values are stored in memory units in a tabular form and then retrieved, based on the input data (i.e. the bits that are to be encoded). These intermediate values are used to derive the same discrete values N. Accordingly the invention comprises a plurality of time-delay units which propagate the input data, memory means for storing the intermediate values and a master summer.

Addressing means are used to retrieve the intermediate values in the memory based on the delayed input bits and a carrier frequency sub address means. The intermediate values from the memory are fed to the summer to produce the desired output signal.

DESCRIPTION OF THE PREFERRED EMBODIMENT

Figure 1:
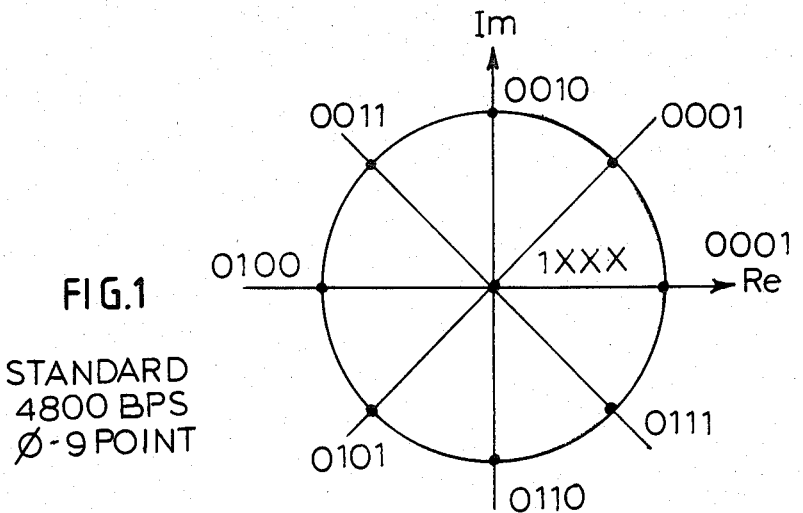
FIG. 1 shows a 4800 B/S 8-phase, 9 point eye diagram (the center point or ninth being the zero output state)

The present description is by way of example for a communication system of 4800 B/S, 1600 symbols/sec, and 9600 ouput sample rate. A standard eye diagram for such a system is shown in FIG. 1. Typically such an eye diagram defines nine points; eight of them being disposed on a circle and the ninth at the origin. This ninth point is expressed as 1XXX and it is used to introduce a silent period on the output of the transmitter modem. The other eight points may be expressed as complex numbers with an X, (real component) and a Y, (imaginary component).

Figure 2:
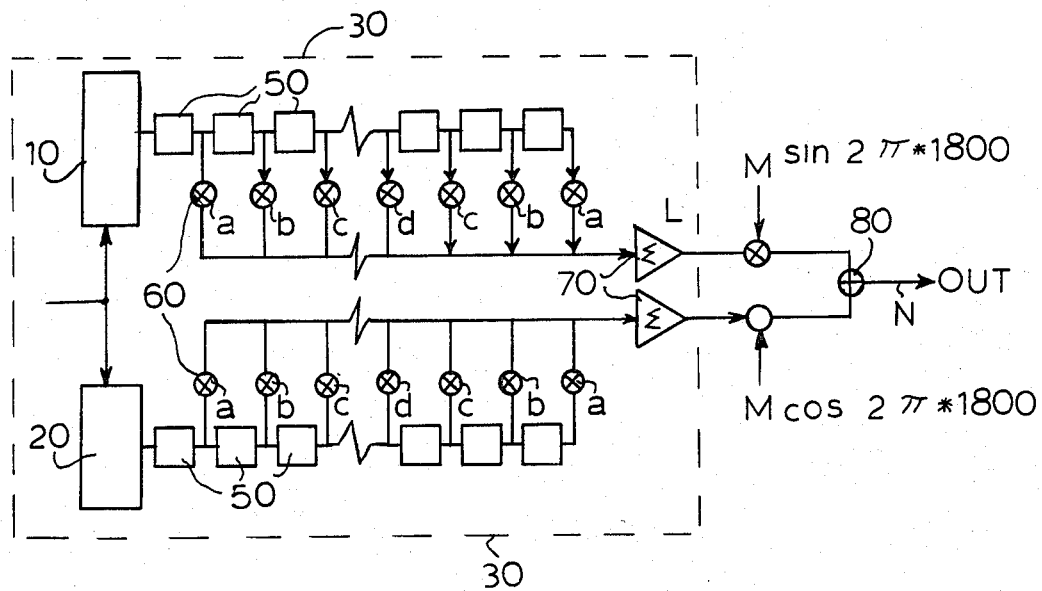
FIG. 2 shows a standard prior art digital QAM/PSK modulation system.
Figure 3:
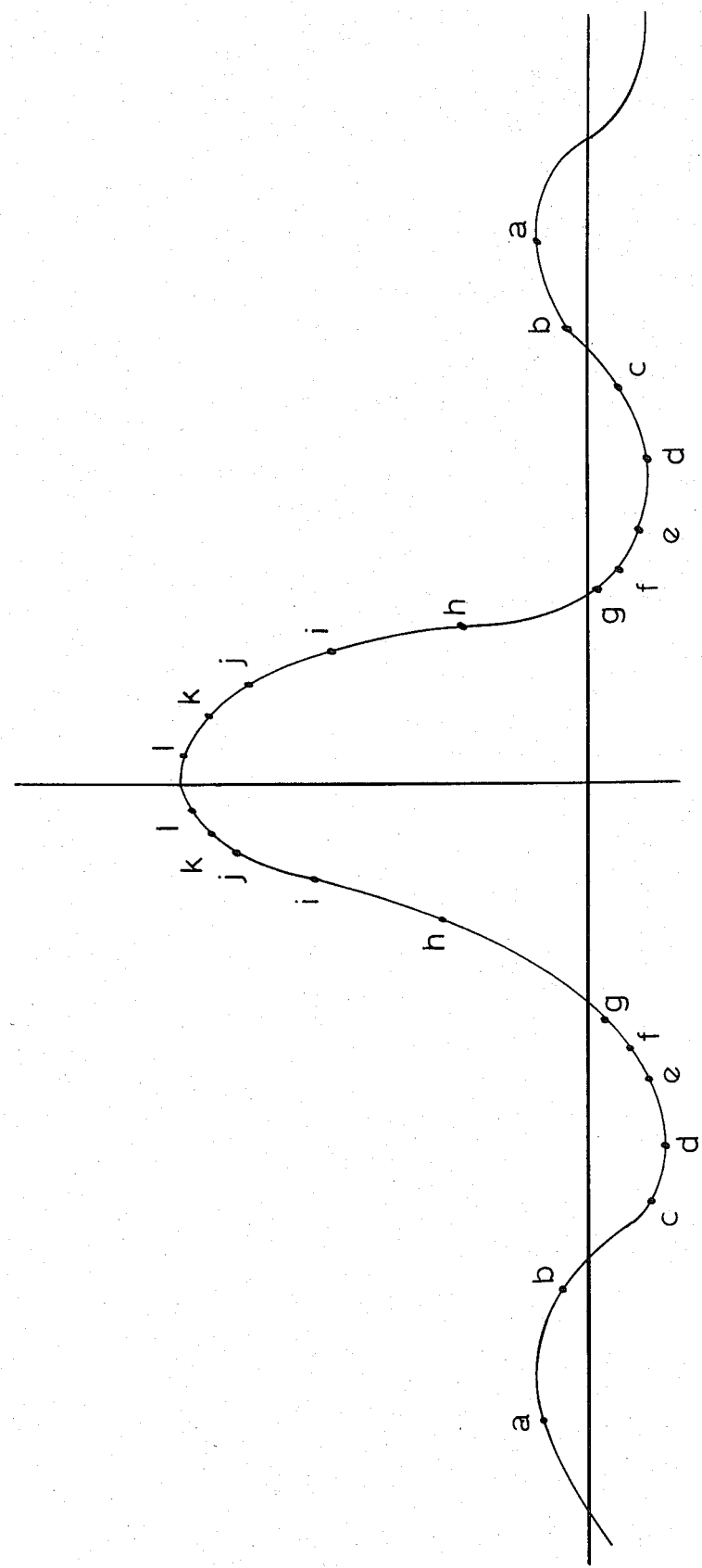
FIG. 3 shows the relative values of the filter coefficients for the system of FIG. 2.

A standard prior art system for transmitting the points of FIG. 1 is shown in FIG. 2. It comprises an X-axis address means 10 and a Y-axis address means 20. The outputs of each of these address means which occur at 1600 symbols/sec are fed respectively into transversal digital filters 30 and 40 which operate at 9600 b/s. Each one of these filters comprises a plurality of delay means 50 and a plurality multipliers 60. There is a multiplier 60 associated with each delay means. For the system defined above, the transversal digital filter has 24 taps, and the delay is 1/9600 s. There are 24 coefficients associated with the filters and their relative values are shown on FIG. 3. If the coefficients are designated as a,b,c, . . . k,l then the sequence in which they are fed into multipliers 60 is in the form a,b,c, . . . k,l,l,k, . . . c,b,a. The results K and K' of the multiplications are fed into respective master summers 70 and the outputs L and L' of the summers are used to multiply a sine or a cosine carrier frequency signal. Thus, as shown in FIG. 2, the output of the filter associated with X-axis address means 10 modulates an 1800 Hz sine wave resulting in output M while the output of the filter associated with Y-axis address means 20 modulates an 1800 Hz cosine wave resulting in M'. The two outputs M and M' are then added at 80 and the result N is the desired output QAM/PSK signal. The system shown in FIG. 2 uses fifty multipliers, forty-eight delay elements, and three summers.

Figure 4:
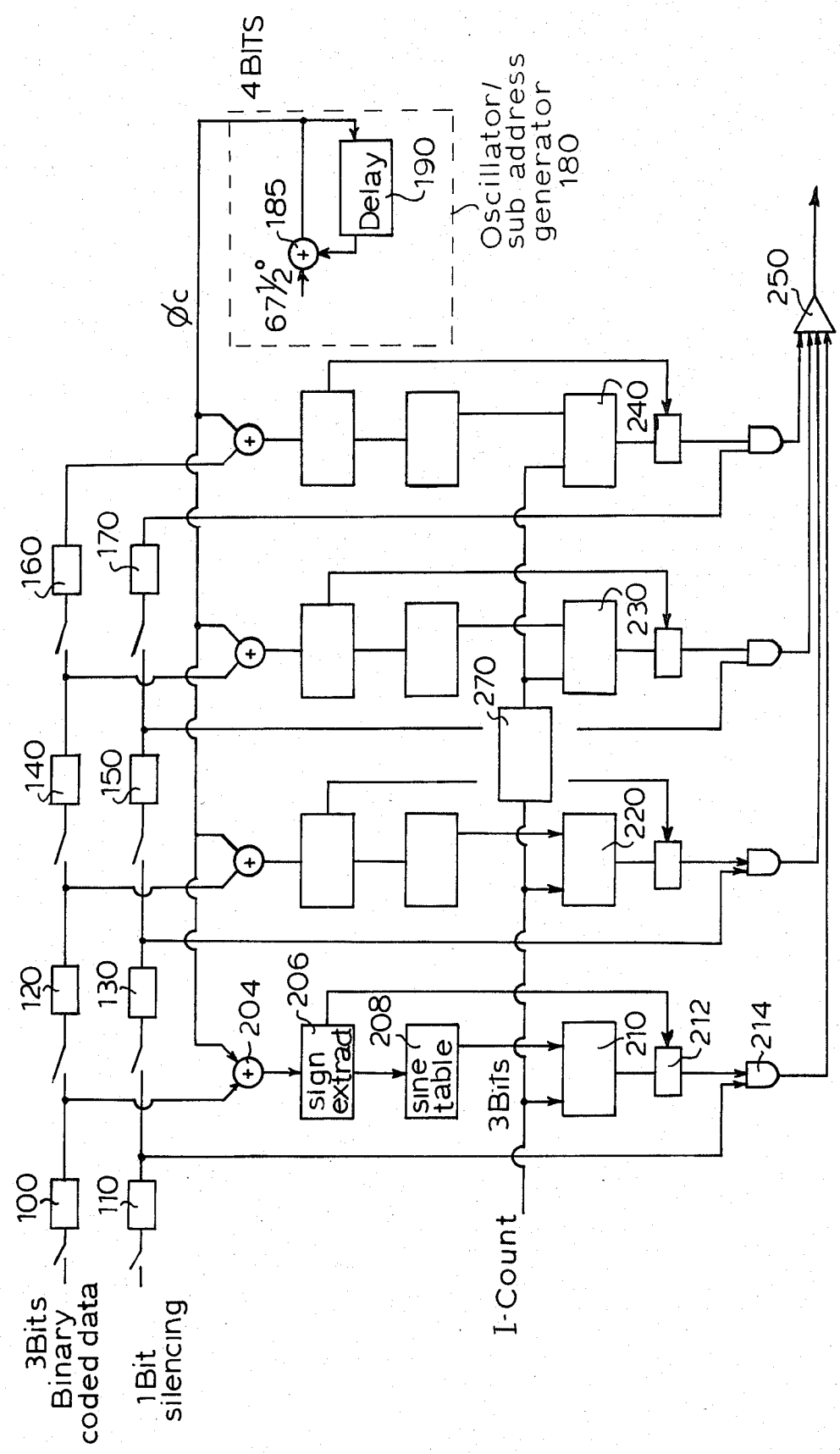
FIG. 4 shows the components of the preferred embodiment of the present invention.

The encoder provided by this invention is shown in FIG. 4 where the binary coded data is fed into delay means 100 and 110. The most significant bit (indicating the silence bit at the origin of the eye diagram in FIG. 1) is fed into delay means 110 at a rate of 1600 inputs per second, from which it is propagated through delay means 130, 150 and 170. Each one of these means is a one bit delay unit. The remaining bits are fed into delay means 100 as 3 bit binary coded data, from which they are propagated through delay means 120, 140 and 160. Each one of these means is a three bit delay unit.

The encoder also comprises a sub-addressing means formed of a carrier oscillator 180 which includes an adder 185 and a delay unit 190 in a feedback loop wherein the delay unit is set so that the oscillator 180 outputs a 4 bit subaddress at a rate of 9600 subaddresses per second. The output of the oscillator is incremented every $360° \times 1800/9600 = 67\frac{1}{2}°$.

Associated with each 3 bit delay means 100, 120, 140 and 160 and each 1 bit delay means 110, 130, 150 and 170 there are a number of circuits collectively indicated by the numeral 200.

These circuits are designed to provide six discrete values to master summer 250. Thus, the four circuits 200 provide a total of 24 discrete values, which are equal to the number of values provided by the standard decoder of FIG. 2. Circuit 200 associated with delay means 110 will now be described in detail, it being understood that unless otherwise noted, the same description applies to all of them.

Circuit 200 comprises a summer 204, sign extractor 206, sine table 208, memory table 210, sign designator 212, and disabling means 214.

The summer 204 adds the four bits generated by the sub-addressing means 180 to the three bits from respective delay line 100. The four bit sum P(I) is fed to sign extractor 206 which determines the sign of the sine function of the angle which corresponds to said sum. Since the sum has four bits, it represents angles which are multiples of $360°/16 = 22\frac{1}{2}°$. If this angle is less than 180°, its sine is positive; otherwise its sine is negative. Next the three least significant bits of the sum are transmitted to sine look-up table which finds the first quadrant equivalent to the sum. Thus for example if the sum P(I) is 1010 or 225°, the sin A is negative, and sin 225° =/sin 45°/. Therefore for an input of 1010 to the sign extractor, the sine table generates the bits 10 corresponding to 45°. Since there are only four possible values ($22\frac{1}{2}°$, 45°, $67\frac{1}{2}°$, 90°) for the sine table output only a 2-bit output Si is necessary. This output is fed into memory table 210. Simultaneously with each 2-bit input Si equivalent to the above angles, the memory also receives a 3-bit input I which initially is one and is incremented for every new angle, i.e. every time the output of oscillator 80 is implemented until binary 6 is reached. The next value for I after 6 is 1. Thus I is in the form of I=1,2,3,4,5,6,1,2,3, . . . Each I value is associated with one of the coefficients K(I) of the transversal digital filter. Thus for table 210 K(1)=a, K(2)=b, etc, and for table 220 K(1)=g, K(2)=h, etc. The K's for tables 230 and 240 are the same as the K's for tables 220 and 210 respectively, with the I count reversed by circuit means 270.

The memory table 210 holds an 8-bit equivalent of the product K(I) x sin (Si). This product is fed to sign designator 212 which tacks on a sign as determined by sign extractor 206. The output Q(I) of 212 is fed through zeroing means 214 to master summer 250.

In particular if the delay means 100 holds the binary number 011 the following six outputs Q(I) will be generated:

| I | P (I) | Si | OUTPUT Q (I) |
|---|---|---|---|
| 1 | $202\frac{1}{2}°$ | sin $22\frac{1}{2}°$ | $-a$ sin $22\frac{1}{2}°$ |
| 2 | 270° | sin 90° | $-b$ sin 90° |
| 3 | $337\frac{1}{2}°$ | sin $22\frac{1}{2}°$ | $-c$ sin $22\frac{1}{2}°$ |
| 4 | $22\frac{1}{2}°$ | sin $22\frac{1}{2}°$ | $d$ sin $22\frac{1}{2}°$ |
| 5 | 90° | sin 90° | $e$ sin 90° |
| 6 | $157\frac{1}{2}°$ | sin $22\frac{1}{2}°$ | $f$ sin $22\frac{1}{2}°$ |

When a silence bit is fed into any one of the delay means it by-passes the rest of the look-up circuit and goes directly into the respective AND gate 214 disabling its output.

By using the look-up circuits, this invention effectively eliminates the use of multipliers. It is evident that numerous modifications may be made to this invention without departing from its scope as defined in the appended claims.

What is claimed is:

1. An encoder for a QAM transmitter for transmitting a series of symbols, each symbol corresponding to a group of bits, comprising:
    a plurality of delay means through which said group of bits is delayed sequentially by a first period;
    an oscillator for generating a subaddress signal which is incremented periodically in accordance with a second period which is shorter than said first period;
    a plurality of look-up means corresponding to said delay means and having memory means, each of said look-up means receiving a delayed group of bits from a respective delay means and being provided for selecting a value from said memory means which corresponds to said delayed group of bits and said subaddress signal; and
    means for adding the value from each of said look-up means to produce said series of symbols.

2. The encoder of claim 1 wherein said first period is an integer multiple of said second period.

3. The encoder of claim 1 wherein said value is selected in accordance with the sum of said delayed group of bits and said subaddress signal.

4. The encoder of claim 3 wherein said sum corresponds to an angle and wherein said value is a product of the sine of said angle and a coefficient.

5. The encoder of claim 4 wherein said coefficient is equal to one of the coefficients of a digital transversal filter.

6. An encoder for encoding QAM-type nine-point symbols, comprising:
    a plurality first group of first delay units through which a group of data bits are propagated sequentially, each group corresponding to one of the QAM-type symbols;
    an oscillator having an output which is incremented periodically;
    a plurality of look-up circuits, corresponding to said delay units, each one comprising: a summer which adds the oscillator output to the output of the corresponding said first delay unit; a sign extractor which determines the sign of the sine of an angle which is equivalent to the summer output; a look-up table which determines a first quadrant equivalent to said angle; a memory means in which constants are stored and adapted to output one of said constants in accordance with the output of said look-up table and the oscillator output; and
    a master summer means which adds the memory means output of the look-up circuits.

7. The encoder of claim 6 wherein said nine-point symbols include a silence symbol, and wherein said encoder includes a plurality of second delay units for propagating said silence symbol, each one of said second delay units being associated with a corresponding look-up circuit and adapted to disable a respective look-up circuit when a silence symbol is present.

8. The encoder of claim 6 wherein each said constant is the product of the sine of the angle equivalent and a coefficient.

9. The encoder of claim 8 wherein there are a first, second, third, and fourth look-up circuit and wherein said first period is six times larger than said second period.

10. The encoder of claim 9 wherein the coefficients of said first and fourth look-up circuits are a, b, c, d, e, and f, and the coefficients of the second and third look-up circuits are g, h, i, j, k, and l, where a, b, c, d, e, f, g, h, i, j, k and l are the coefficients of a 24-tap transversal digital filter.

* * * * *